(12) United States Patent
Magnone et al.

(10) Patent No.: US 11,098,820 B2
(45) Date of Patent: Aug. 24, 2021

(54) THREE-WAY VALVE DRIVABLE BY A PUMP

(71) Applicant: ELBI INTERNATIONAL S.p.A., Turin (IT)

(72) Inventors: Luca Magnone, Pino Torinese (IT); Luigi Aita, Gassino Torinese (IT)

(73) Assignee: ELBI INTERNATIONAL S.p.A., Turin (IT)

(*) Notice: Subject to any disclaimer, the term of this patent is extended or adjusted under 35 U.S.C. 154(b) by 25 days.

(21) Appl. No.: 16/788,739

(22) Filed: Feb. 12, 2020

(65) Prior Publication Data
US 2020/0263804 A1    Aug. 20, 2020

(30) Foreign Application Priority Data

Feb. 20, 2019 (IT) .......................... 102019000002459

(51) Int. Cl.
| | |
|---|---|
| *G05D 11/00* | (2006.01) |
| *F16K 31/36* | (2006.01) |
| *F16K 11/02* | (2006.01) |
| *F16K 11/048* | (2006.01) |
| *F24D 3/10* | (2006.01) |
| *F24D 19/10* | (2006.01) |

(52) U.S. Cl.
CPC ............ *F16K 31/36* (2013.01); *F16K 11/022* (2013.01); *F16K 11/048* (2013.01); *F24D 3/105* (2013.01); *F24D 19/1024* (2013.01); *F24D 2220/0242* (2013.01); *Y10T 137/2567* (2015.04); *Y10T 137/86413* (2015.04)

(58) Field of Classification Search
CPC ............... F16K 11/048; F24D 19/1024; F24D 2220/0242; F24D 3/105; Y10T 137/2567; Y10T 137/86413
See application file for complete search history.

(56) References Cited

U.S. PATENT DOCUMENTS

| | | | |
|---|---|---|---|
| 2,893,416 A * | 7/1959 | Hegstad ................ | F16K 11/044 137/119.03 |
| 3,910,303 A | 10/1975 | Rydberg | |
| 2015/0014425 A1* | 1/2015 | Olesen ................ | F24D 19/1069 237/8 C |
| 2018/0283702 A1* | 10/2018 | Blad ................... | F24D 19/1024 |
| 2020/0263880 A1* | 8/2020 | Magnone ............ | F24D 19/1036 |

OTHER PUBLICATIONS

Italian Search Report dated Oct. 21, 2019 in Italian Application No. 201900002459.

* cited by examiner

*Primary Examiner* — Robert K Arundale
(74) *Attorney, Agent, or Firm* — Sughrue Mion, PLLC

(57) ABSTRACT

Three-way valve drivable by a pump, switchable between at least two switch positions wherein a first port is selectively in fluid communication with a second port or with a third port. The three-way valve comprises a movable support and a pair of obstructing members carried by the movable support, at least one of which is responsive to the pressure applied by the pump at the first port, at least one of the movable support and obstructing members being movable due to transitions between an off-state and an on-state of the circulation pump. The obstructing members are adapted to engage reciprocatingly the respective seats of the three-way valve. The obstructing members are capable of changing shape synchronously when the pump switches from the off-state to the on-state.

11 Claims, 6 Drawing Sheets

THREE-WAY VALVE DRIVABLE BY A PUMP

CROSS-REFERENCE TO RELATED APPLICATIONS

This application claims priority to Italian Patent Application No. 102019000002459, filed Feb. 20, 2019, the entire contents of which are incorporated herein by reference.

FIELD OF THE INVENTION

The present invention concerns in general hydraulic systems that are arranged to distribute the fluid flows between different circuits of an installation, particularly in installations for heating and generating domestic hot water.

BACKGROUND

It is known that, in the aforesaid installations, motorized three-way valves are used to selectively direct water to various heat exchangers through different hydraulic circuits.

New solutions have recently been proposed that provide for the use of non-motorized three-way valves, which switch between different positions according to the pressure produced by the circulation pump.

An object of the present invention is to make available a three-way valve that operates without a motor, and therefore does not require electricity for its operation, but rather is operated only by the hydraulic energy of the fluid flow, which is simple and reliable.

SUMMARY OF THE INVENTION

This and other objects are achieved according to the invention with a three-way valve drivable by a pump, said three-way valve comprising a first port, a second port and a third port;
  wherein said three-way valve is switchable between at least two switch positions in which the first port is selectively in fluid communication with the second port or with the third port;
  wherein said three-way valve comprises a movable support and a pair of obstructing members carried by said movable support, at least one of which is responsive to the pressure applied by the pump at the first port, at least one of said movable support and obstructing members being movable due to transitions between an off-state and an on-state of the circulation pump;
  wherein the obstructing members are adapted to engage reciprocatingly respective seats of the three-way valve interposed between the first port and the second port, and between the first port and the third port, respectively,
  wherein said obstructing members are capable of changing shape synchronously when the pump switches from the off-state to the on-state.

According to the present invention it is therefore possible to direct the water into the different circuits of the heating system with a simple and reliable hydraulic system, which operates without a motor and therefore does not require electricity for its operation, being operated only by the hydraulic energy of the water flow.

With such a system the cost of the valve and the cost of the electrical/electronic control part of the valve are further reduced. Hydraulic performance is also improved and water hammering is avoided.

In particular, said obstructing members may be arranged on the movable support in such a way as to have a concavity facing towards one or the other of opposed motion directions of the movable support, said obstructing members changing the orientation of the concavity when the pump switches from the off-state to the on-state. Said change of concavity achieves the change of shape of the obstructing members.

In this case, when one of the obstructing members is engaged against the respective seat of the three-way valve, said obstructing member is capable of changing the orientation of the concavity due to pressure when the pump switches from the off-state to the on-state, as well as driving said movable support towards said seat against the action of an elastic force, and wherein the other of the obstructing members changes the orientation of the concavity by engagement against a control element, distinct from said seats.

According to an embodiment, the three-way valve further comprises return means associated with the movable support, which produce an elastic force to bias the movable support towards an intermediate position between the seats of the three-way valve, wherein this intermediate position is associated with the off-state of the circulation pump.

In particular, when one of the obstructing members is engaged against the respective seat of the three-way valve, said movable support is movable towards said seat against the action of said elastic force due to pressure when the pump switches from the off-state to the on-state.

Moreover, said movable support may be capable of driving the obstructing members due to said elastic force when the pump switches from the on-state to the off-state, moving one of said obstructing members away from the respective seat and bringing the other of said obstructing members against the respective seat of the three-way valve.

According to a specific embodiment, the movable support is arranged to be slidable between the opposing seats of the three-way valve, and the obstructing members are each made as a flexible conical ring arranged around the movable support.

In this case, when one of the obstructing members is engaged against one of said opposing seats of the three-way valve, said obstructing member is capable of overturning due to pressure when the circulation pump switches from the off-state to the on-state, as well as driving said movable support towards said seat against the action of said elastic force.

BRIEF DESCRIPTION OF THE DRAWINGS

Further features and advantages of the invention will become apparent from the detailed description that follows, provided by way of non-limiting example with reference to the accompanying drawings, wherein.

DETAILED DESCRIPTION OF THE INVENTION

Figure 1:
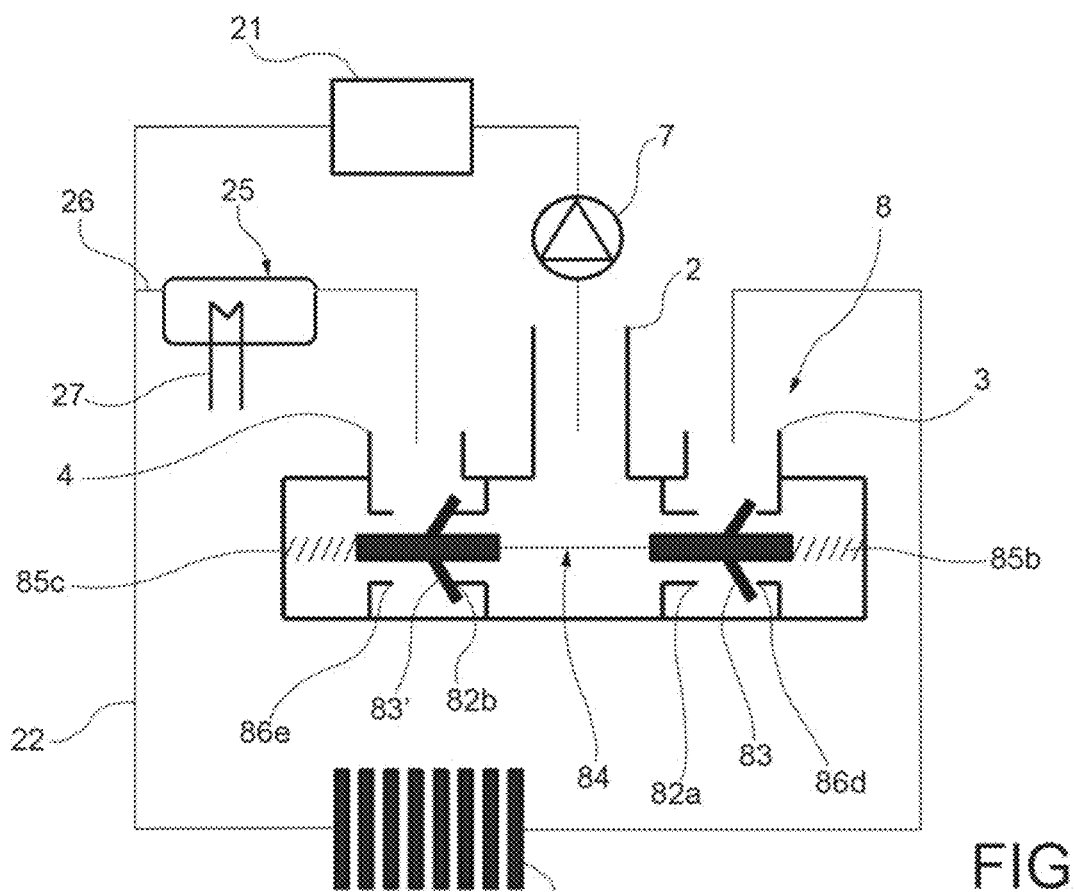
FIGS. 1 to 4 are schematic representations of an installation for heating and generating domestic hot water equipped with a three-way valve according to the invention, in different operating positions.

FIGS. 1-4 of the accompanying drawings schematically represent an installation for heating and generating domestic hot water in which a three-way valve according to the invention is used. However, the three-way valve is not limited to this type of use.

The installation comprises a primary heat exchanger 21 intended to heat a flow of water for use in a hydraulic heating circuit comprising (for example) a pipeline 22 extending between the outlet side and the inlet side of the primary heat exchanger 21, and along which are interposed one or more radiators 24. In general, the primary heat exchanger 21 may, for example, be associated in a completely conventional way with a gas, wood or pellet burner, heat pump or solar cell. The installation further comprises a secondary heat exchanger 25, to transfer heat from a flow of water from the primary heat exchanger 21 and flowing in a pipeline 26, to a flow of domestic water flowing in a pipeline 27. The pipeline 27 is connected on the one side to a water source, for example, to the water supply network, and on the other to a domestic hot water tap.

The installation further comprises a circulation pump 7 and a three-way valve 8 hydraulically arranged in series. The pump and valve may be assembled in a single body.

The three-way valve 8 comprises in FIG. 1, a first port 2, in the example a fluid outlet port, for connecting to the primary heat exchanger 21, a second port 3, in the example an inlet port, for connecting to the heating circuit 22, 24, and a third port 4, in the example a second inlet port, for connecting to the secondary heat exchanger 25.

The structure and operation of the three-way valve 8 shall now be described.

The three-way valve 8 is switchable between at least two positions in which the first port 2 is selectively in fluid communication with the second port 3 or the third port 4, so that the water passing through the primary exchanger 21 is directed to the heating circuit 22, 24 or to the secondary exchanger 25 for heating domestic water.

The three-way valve 8 is of the non-motorized type, and is responsive to the pressure applied by the circulation pump 7 at the first port 2 (outlet port), as will be clarified hereinafter.

With particular reference to FIGS. 5 to 13, the three-way valve 8 comprises a valve body 81, in which the first port (outlet port) 2, the second port (first inlet port) 3 and the third port (second inlet port) 4 are obtained, all of which are connected to a switching chamber obtained in the valve body 81. In the example shown the valve body 81 comprises five parts assembled together, namely a central part 81a, two side parts 81b attached to the central part 81a and two side caps 81d and 81e attached to the side parts 81b and 81c respectively.

Inside the switching chamber there are two obstructing members 83, 83', each of which are arranged so as to assume the shape of a flexible conical ring. The obstructing members 83, 83' are carried by a movable support 84 made as a sliding shuttle inside the valve body 81. In the example shown, the movable support 84 comprises a central rod 84a and two side support parts 84b and 84c attached to the ends of the central rod 84a. Each of the obstructing members 83, 83' is made of a disc of flexible material (e.g. rubber) with a hole in the center, which, due to the difference in diameter between the hole of the disc and the larger diameter shaft of the support part 84b, 84c of the movable support 84 on which it is mounted, assumes the shape of a flexible conical ring that is seen in the figures. The direction of translation of the movable support is represented by the arrow x in FIG. 5. Each obstructing member 83, 83' is mounted in a respective groove 84d, 84e made in the respective part of the movable support 84b, 84c, in such a way that the obstructing members 83, 83' are integral in translation with the movable support 84. The configuration of the grooves 84d and 84e is such as to allow the overturning of the respective obstructing member 83, 83' (rotation at the point of contact with the movable support 84), i.e. the reversal of the direction of conicity with respect to the direction of translation x of the movable support 84, as will be clarified hereinafter.

Figure 10:
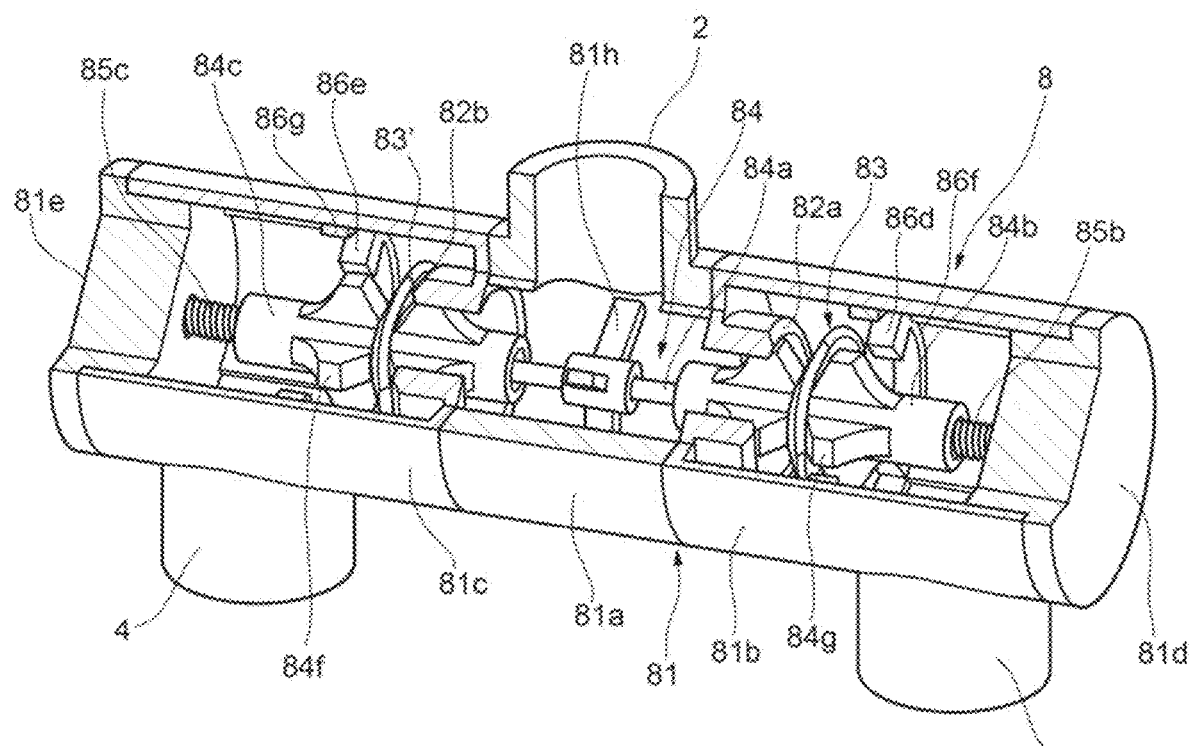
FIG. 10 is a cutaway view of the three-way valve.
Figure 11:
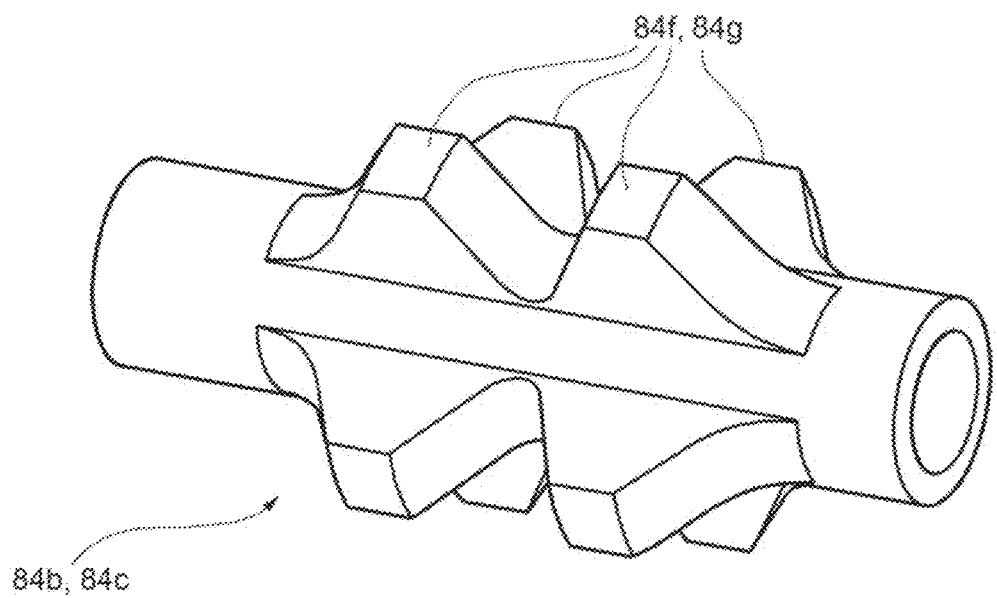
FIG. 11 is a perspective view of a component of the valve of FIG. 10.
Figure 12:
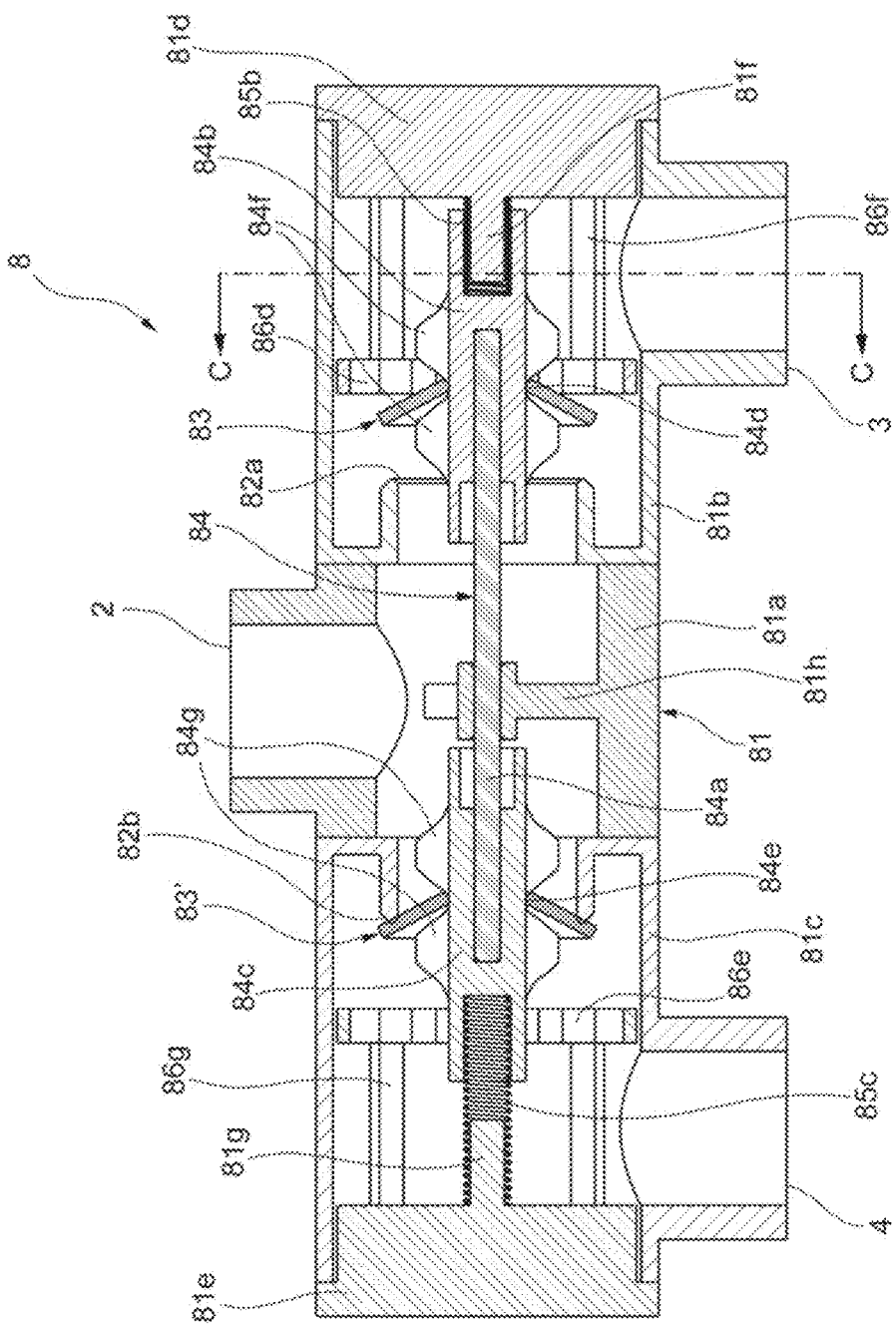
FIG. 12 is a cross-sectional view of the valve of FIG. 10.
Figure 13:
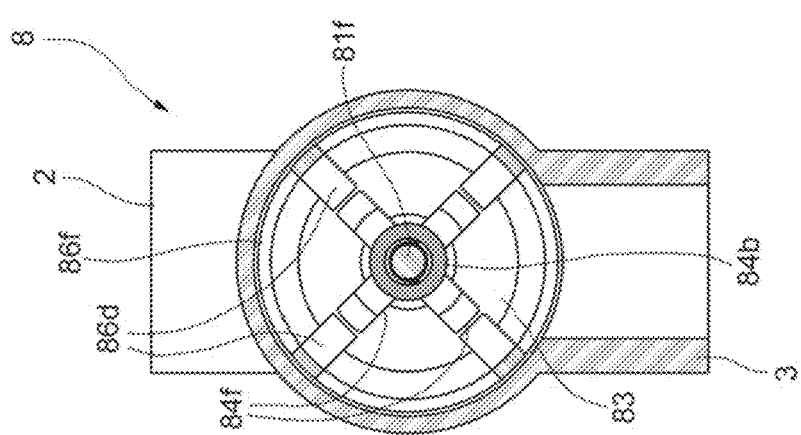
FIG. 13 is a cross-sectional view of the valve taken along the line cc of FIG. 12.

As may be seen in FIGS. 10 and 11, the support parts 84b, 84c have radially protruding parts 84f, 84g which delimit the grooves 84d and 84e in an axial direction, and which alternate angularly with windows or notches for the passage of fluid.

At opposite ends, the movable support 84 is associated with guide rods 81f and 81g obtained on the side caps 81d and 81e, which are inserted in corresponding holes obtained in the support parts 84b and 84c. At the center of the valve body 81, the central rod 84 of the movable support is slidably supported by a rod support 81h formed integrally with the central part 81a of the valve body 81.

Between the ends of the movable support 84 and the side caps 81d and 81e of the valve body 81 are interposed respective opposing elastic means 85b and 85c, Which bias the movable support 84 towards an intermediate position or equilibrium position, represented in FIGS. 1, 3, 5 and 8, which occurs when the same pressure is applied in ports 2, 3 and 4 (i.e. circulation pump 7 switched off). In the example shown, the elastic means 85b and 85c are made as coil springs arranged coaxially to the guide rod 81f and the guide rod 81g respectively.

Inside the switching chamber there are further obtained a first and a second valve seat 82a and 82b, respectively interposed between the first port 2 and the second port 3, and between the first port 2 and the third port 4. The valve seats 82a and 82b are suitable to be used reciprocatingly by the first obstructing member 83 and by the second obstructing member 83', respectively. The first port 2 is oriented orthogonally to the axis that joins the valve seats 82a and 82b.

Near each of the side caps 81d and 81e there is arranged (at least) one control element 86d and 86e protruding into the switching chamber, the function of which will be clarified hereinafter. In the example shown, the control elements 86d and 86e are made as projections extending radially into the switching chamber, particularly extending from a cage 86f, 86g obtained integrally with the side cap 81d and, respectively, with the side cap 81e.

Figure 5:
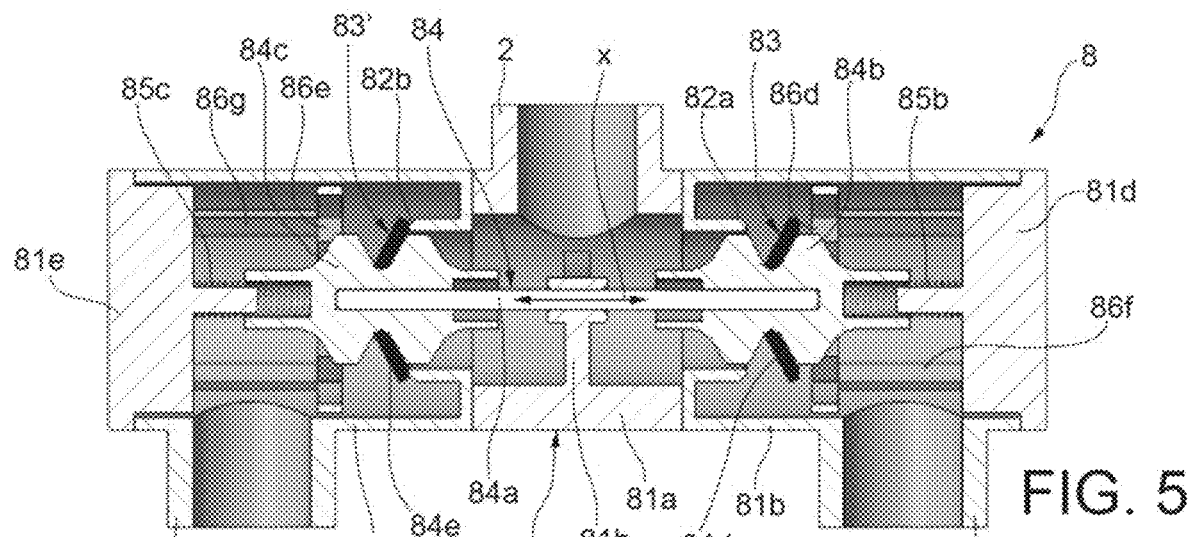
FIGS. 5 to 9 are cross-sectional views of the three-way valve, in different operating positions.

In FIGS. 1 and 5, the three-way valve 8 is shown in a rest position, with the circulation pump 7 in an off-state. The movable support 84 is in the intermediate or rest position, with the second obstructing member 83' in engagement against the second seat 82b. Therefore, the first port 2 is in fluid communication with the second port 3, while the fluid communication between the first port 2 and the third port 4 is interrupted. Since the circulation pump 7 is switched off, there is no fluid circulation.

Figure 2:
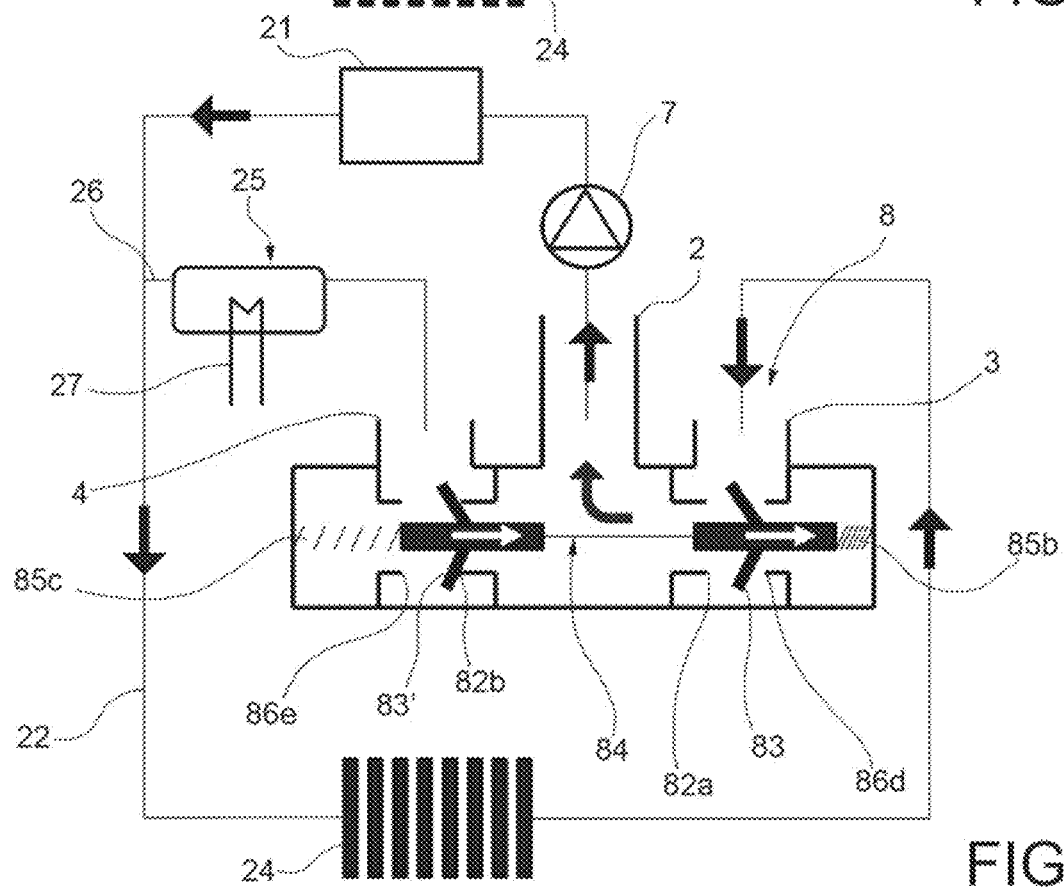
Figure 6:
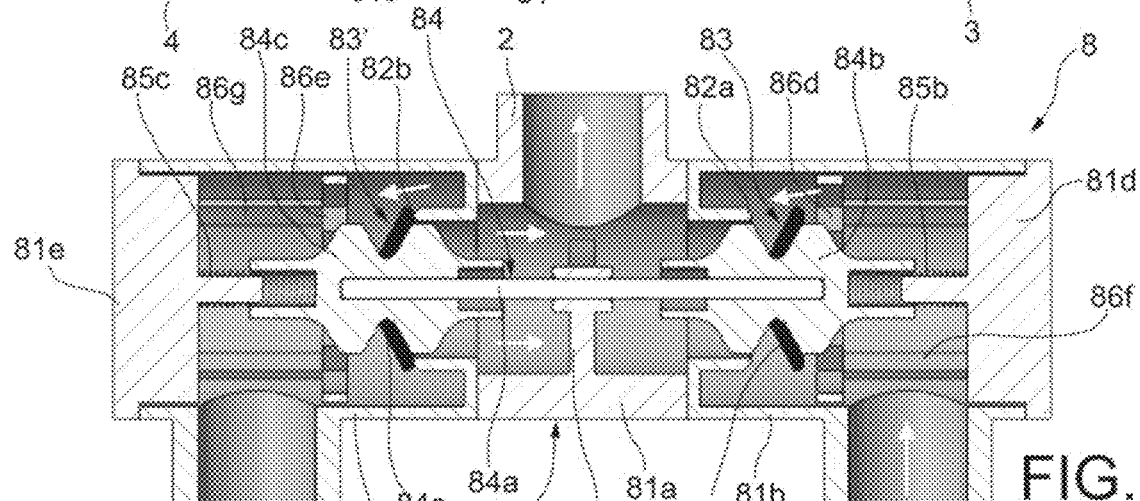
Figure 7:
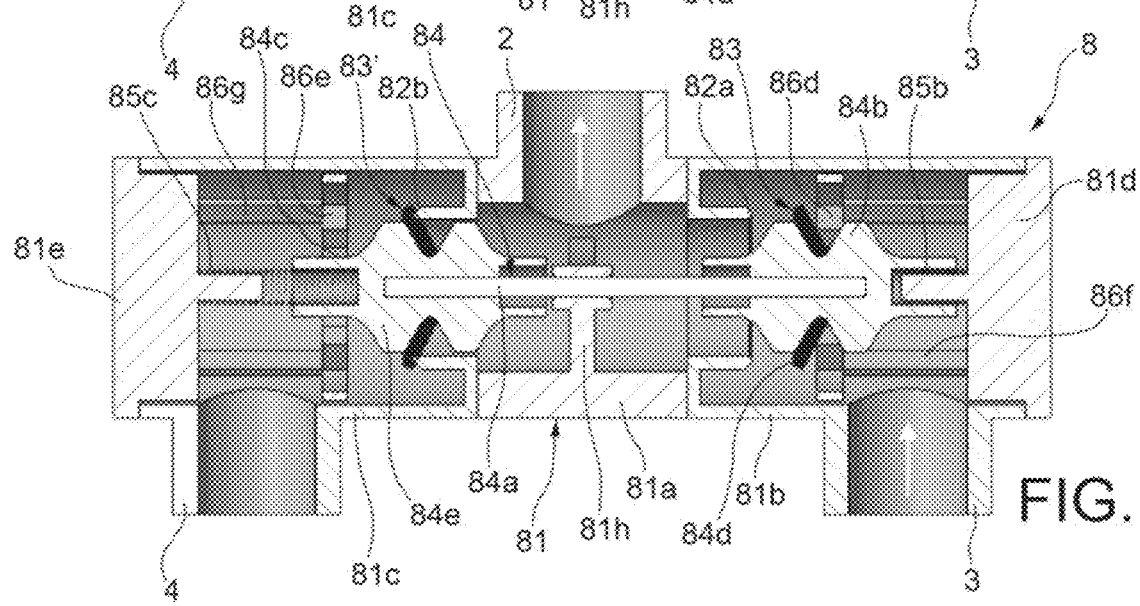

FIG. 6 and FIGS. 2 and 7 show the next operating phase, when the circulation pump 7 is switched on. During the pump start-up phase, the second obstructing member 83', closed on the second seat 82b, is sucked in by the flow originating from the second port 3 which is in fluid communication with the first port 2 (FIG. 6). The suction applied on the second obstructing member 83' causes the reversal thereof and the sealed closure of the second seat 82b (FIGS. 2 and 7). The overturning of the second obstructing member 83' drives the movable support 84 towards the second seat 82b, against the action of the spring 85b which compresses, and the spring 85c which extends. Due to the movement of the movable support 84, the first obstructing member 83 is brought to engage the first control member 86d, which causes the reversal thereof by contact. As the circulation pump 7 is switched on, there is a fluid flow from the second port 3 to the first port 2, i.e. a fluid flow in the heating circuit 22, 24. The system may also work with the second obstructing member 83' almost in engagement against the second seat 82b (considering the state shown in FIG. 6), i.e. with the second obstructing member 83' near the second seat 82b with the movable support 84 in the intermediate position. Turning on the circulation pump 7 will in effect tend in a first phase to bring the second obstructing member 83' near to the second seat 82b, causing the system to go through the states described above.

Figure 3:
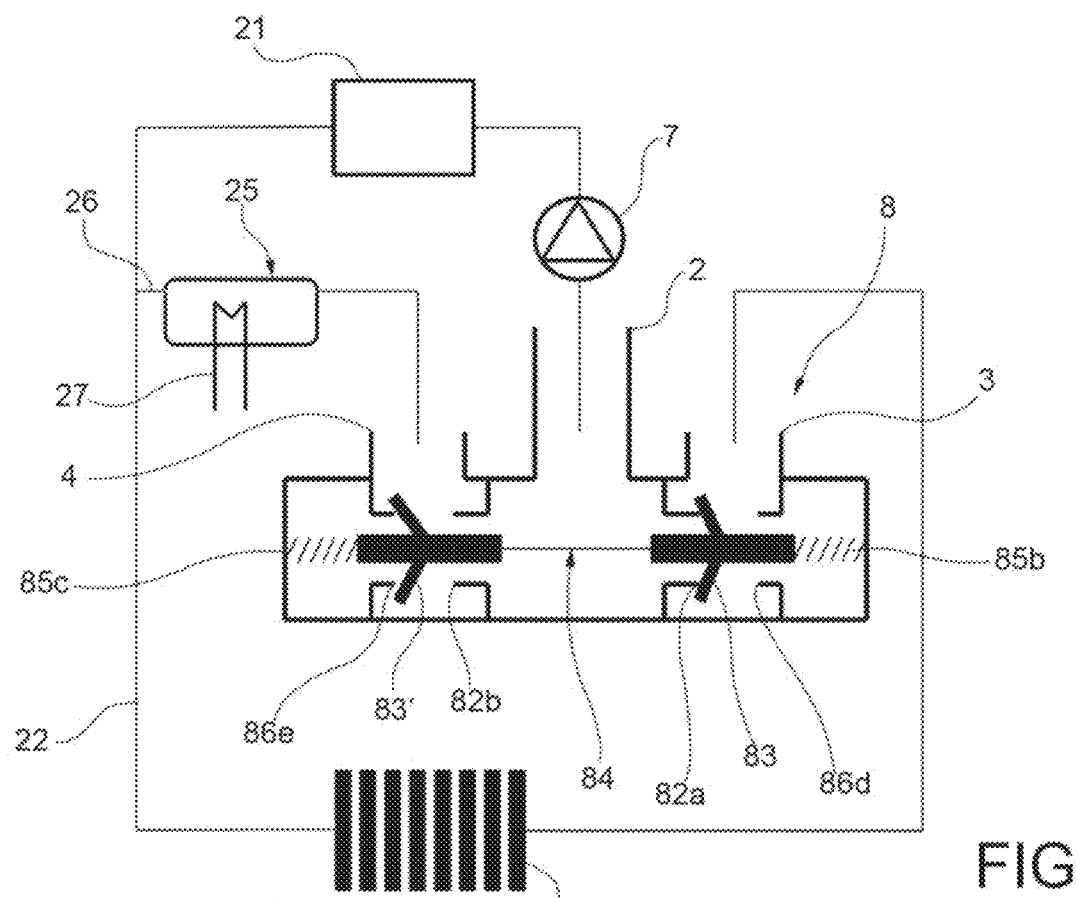
Figure 8:
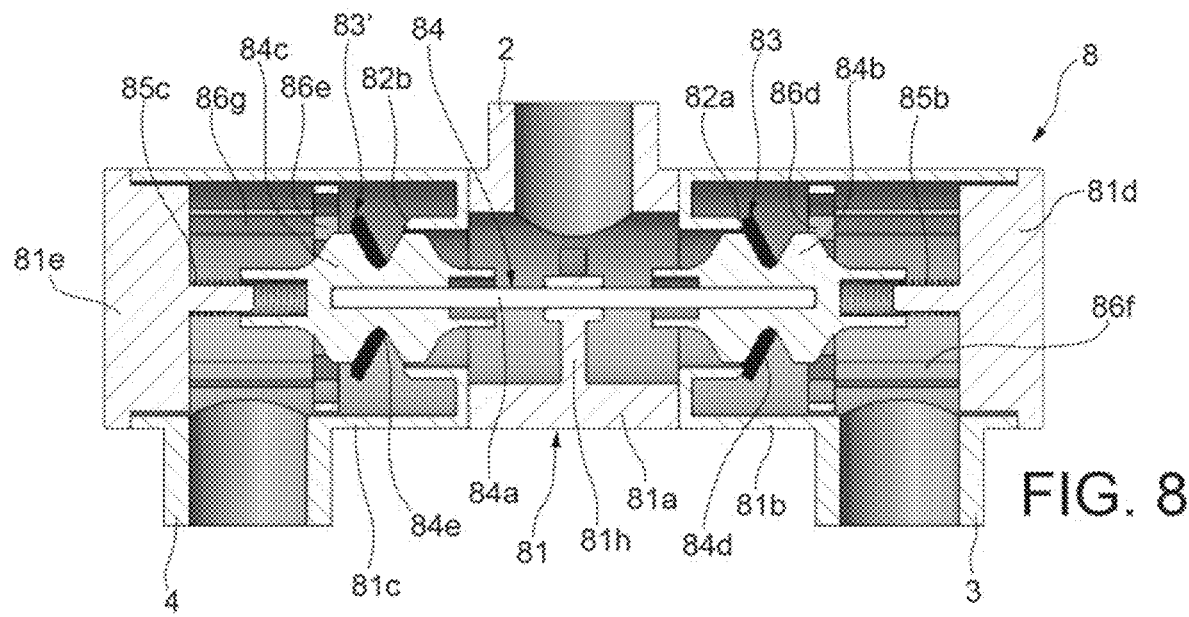

FIGS. 3 and 8 show the third operating phase, when the circulation pump 7 is switched off again. Stopping the pump interrupts the fluid circulation, and therefore the movable support 84 returns to the equilibrium position due to the return force exerted by the springs 85b and 85c. The movable support 84 drives the obstructing member 83 and 83' with it, causing the former to engage against the first seat 82a and moving the latter away from the second seat 82b. The first obstructing member 83, having reversed its conicity in the previous operating phase, thus interrupts the fluid communication between the first port 2 and the second port 3, i.e. interrupts the heating circuit 22, 24. A fluid communication is instead established between the first port 2 and the third port 4, i.e. with the secondary exchanger 25.

Figure 4:
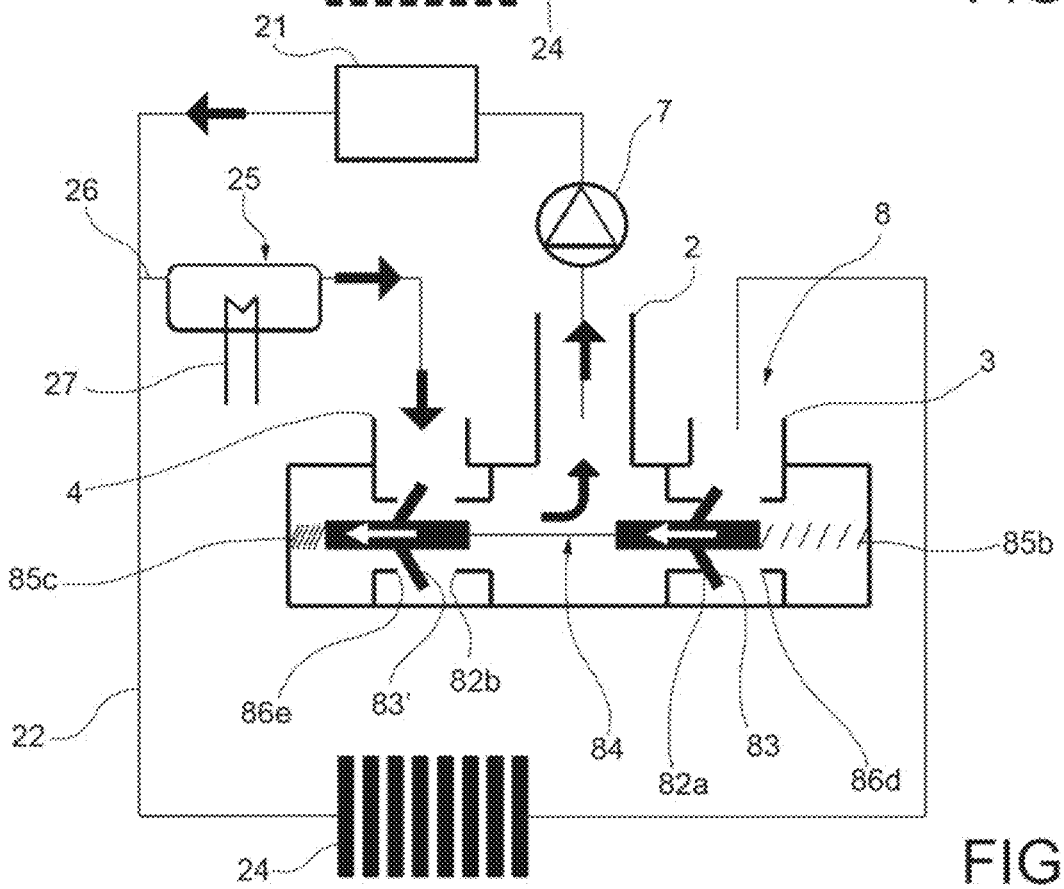
Figure 9:
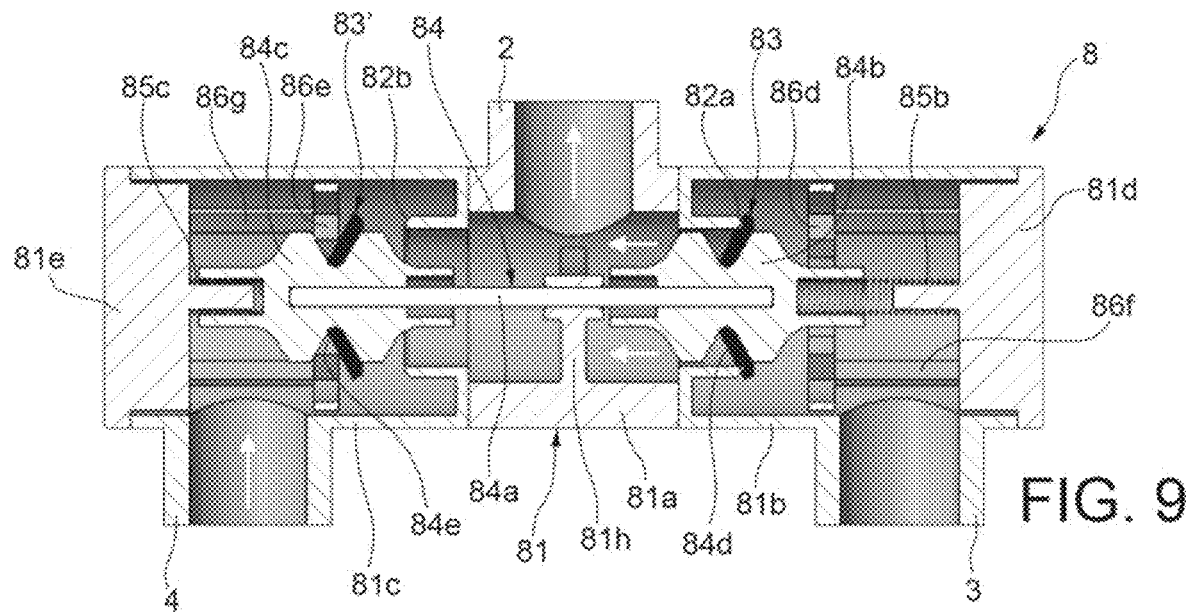

FIGS. 4 and 9 show the fourth operating phase, when the circulation pump 7 is switched on again. When the pump restarts, the first obstructing member 83, which is closed on the first seat 82a, is sucked in by the flow coming from the third port 4. The suction applied on the first obstructing member 83 causes the reversal thereof and the sealed closure of the first seat 82a. The reversal of the second obstructing member 83' |drives|[41] the movable support 84 towards the first seat 82a, against the action of the spring 85c which compresses, and the spring 85d which extends. Due to the movement of the movable support 84, the second obstructing member 83' is brought to engage the second control member 86e, which causes the reversal thereof by contact. As the circulation pump 7 is switched on, there is a fluid flow from the third port 4 to the first port 2, i.e. a fluid flow into the secondary exchange 25.

If the circulation pump 7 is then stopped, the flow is interrupted again, and therefore the movable support 84 returns to the equilibrium position due to the return force exerted by the springs 85b and 85c, and drives with it the obstructing members 83, 83', returning the three-way valve 8 to the position shown in FIGS. 1 and 5.

The valve described above thus operates in a cyclical manner, reciprocatingly opening and closing the heating circuit 22, 24 and the secondary heat exchanger circuit 25.

The switching on and off of the circulation pump is controlled by a control unit (not shown) of the installation, according to the user's demands. Sensors, e.g. pressure, temperature or flow sensors, are normally associated with the heating circuit 22, 24 and the secondary heat exchanger circuit 26, 25 respectively to detect the operating state of the two circuits. By means of these sensors, the control unit of the installation is thus able to determine whether the switching state of the three-way valve 8 actually corresponds to the user's demand and, if it does not, to switch the circulation pump 8 on and off again to cause a further switching of the three-way valve. This may be achieved in a short time and in any event in line with the switching times of conventional motorized valves.

The invention claimed is:

1. A three-way valve drivable by a pump, said three-way valve comprising a first port, a second port and a third port;
   wherein said three-way valve is switchable between at least two switch positions in which the first port is selectively in fluid communication with the second port or with the third port;
   wherein said three-way valve comprises a movable support and a pair of obstructing members carried by said movable support, at least one of the obstructing members is responsive to pressure applied by the pump at the first port, at least one of said movable support and obstructing members being movable due to transitions between an off-state and an on-state of the pump;
   wherein the obstructing members are adapted to engage reciprocatingly respective seats of the three-way valve interposed between the first port and the second port, and between the first port and the third port, respectively,
   wherein said valve is characterized in that said obstructing members are capable of changing shape synchronously when the pump switches from the off-state to the on-state.

2. A valve according to claim 1, wherein said obstructing members are arranged on the movable support in such a way as to have a concavity facing towards one or the other of opposed motion directions of the movable support, said obstructing members being capable of changing the orientation of the concavity when the pump switches from the off-state to the on-state.

3. A valve according to claim 2, wherein, when one of the obstructing members is engaged against the respective seat of the three-way valve, said obstructing member is capable of changing the orientation of the concavity when the pump switches from the off-state to the on-state, as well as driving said movable support towards said seat against the action of an elastic force, and wherein the other of the obstructing members changes the orientation of the concavity by engagement against a control element, distinct from said seats.

4. A valve according to claim 1, further comprising return means associated with the movable support and producing an elastic force to bias the movable support towards an intermediate position between the seats of the three-way valve, wherein said intermediate position is associated with the off-state of the pump.

5. A valve according to claim 4, wherein, when one of the obstructing members is engaged against the respective seat of the three-way valve, said movable support is movable towards said seat against the action of said elastic force when the pump switches from the off-state to the on-state.

6. A valve according to claim 5, wherein said movable support is capable of driving the obstructing members due to said elastic force when the pump switches from the on-state to the off-state, moving one of said obstructing members away from the respective seat and bringing the other of said obstructing members against the respective seat of the three-way valve.

7. A valve according to claim 6, wherein the movable support is slidably arranged between the seats of the three-way valve and the obstructing members are each formed as a flexible conical ring arranged around the movable support.

8. A valve according to claim 7, wherein, when one of the obstructing members is engaged against the respective seat of the three-way valve, said obstructing member is capable of overturning due to pressure when the pump switches from the off-state to the on-state, as well as driving said movable support towards said seat against the action of said elastic force.

9. A hydraulic unit comprising a three-way valve and a pump, wherein said three-way valve and said pump are assembled into a single body, said three-way valve drivable by the pump, said three-way valve comprising a first port, a second port and a third port;
  wherein said three-way valve is switchable between at least two switch positions in which the first port is selectively in fluid communication with the second port or with the third port;
  wherein said three-way valve comprises a movable support and a pair of obstructing members carried by said movable support, at least one of the obstructing members is responsive to pressure applied by the pump at the first port, at least one of said movable support and obstructing members being movable due to transitions between an off-state and an on-state of the pump;
  wherein the obstructing members are adapted to engage reciprocatingly respective seats of the three-way valve interposed between the first port and the second port, and between the first port and the third port, respectively,
  wherein said valve is characterized in that said obstructing members are capable of changing shape synchronously when the pump switches from the off-state to the on-state.

10. An installation for heating and generating domestic hot water, which installation comprises a primary heat exchanger for heating a water flow usable in a heating hydraulic circuit, a secondary heat exchanger for transferring heat from a water flow coming from the primary heat exchanger to a domestic water flow and a circulation pump for generating the water flow in the primary heat exchanger;
  wherein the installation further comprises a three-way valve drivable by the pump, said three-way valve comprising a first port, a second port and a third port;
  wherein said three-way valve is switchable between at least two switch positions in which the first port is selectively in fluid communication with the second port or with the third port;
  wherein said three-way valve comprises a movable support and a pair of obstructing members carried by said movable support, at least one of the obstructing members is responsive to pressure applied by the pump at the first port, at least one of said movable support and obstructing members being movable due to transitions between an off-state and an on-state of the pump;
  wherein the obstructing members are adapted to engage reciprocatingly respective seats of the three-way valve interposed between the first port and the second port, and between the first port and the third port, respectively,
  wherein said valve is characterized in that said obstructing members are capable of changing shape synchronously when the pump switches from the off-state to the on-state, said first port being connected to the primary heat exchanger, and said second and third port being connected to the heating circuit and to the secondary heat exchanger, respectively.

11. A method for driving a three-way valve by means of a pump, the three-way valve comprising a first port, a second port and a third port;
  wherein said three-way valve is switchable between at least two switch positions in which the first port is selectively in fluid communication with the second port or with the third port;
  wherein said three-way valve comprises a movable support and a pair of obstructing members carried by said movable support, at least one of the obstructing members is responsive to pressure applied by the pump at the first port, at least one of said movable support and obstructing members being movable due to transitions between an off-state and an on-state of the pump;
  wherein the obstructing members are adapted to engage reciprocatingly respective seats of the three-way valve interposed between the first port and the second port, and between the first port and the third port, respectively;
  wherein said valve is characterized in that said obstructing members are capable of changing shape synchronously when the pump switches from the off-state to the on-state;
  wherein, when the pump switches from an on-state to an off-state, the three-way valve switches between said at least two switch positions.

* * * * *